Patented Dec. 12, 1922.

1,438,435

UNITED STATES PATENT OFFICE.

HUGO EDWARD FREDRICK, OF SAN FRANCISCO, CALIFORNIA, ASSIGNOR OF TWENTY-THREE AND THIRTY-FOUR ONE-HUNDREDTHS PER CENT TO WILLIAM H. BISSELL, TWENTY-THREE AND THIRTY-THREE ONE-HUNDREDTHS PER CENT TO FRANK S. SINNICKS, AND TWENTY-THREE AND THIRTY-THREE ONE-HUNDREDTHS PER CENT TO GEORGE J. HENRY, ALL OF SAN FRANCISCO, CALIFORNIA.

ORE CONCENTRATION.

No Drawing. Application filed December 11, 1918, Serial No. 266,296. Renewed May 11, 1922. Serial No. 560,251.

*To all whom it may concern:*

Be it known that I, HUGO EDWARD FREDRICK, a citizen of the United States, residing at San Francisco, in the county of San Francisco and State of California, have invented certain new and useful Improvements in Ore Concentration, of which the following is a specification.

This invention relates to the concentration of sulphide ores (natural or artificial), and ores containing copper (native or precipitated) by the so-called flotation process, wherein pulp consisting of a mixture of finely divided ore and water, together with a flotation agent, is subjected to mechanical agitation to form a froth, or to aeration without agitation, as in the so-called bubbles column process, to cause flotation and separation of the ore values.

My present invention is based on the discovery that acridine and its derivatives, and salts of the same, are highly useful as flotation agents in the said process of concentration of ores.

The acridine series of hydrocarbons herein referred to comprise certain organic bases found in coal-tar and wood-tar, or are produced by the distillation of other organic substances, such as bones, hair, hoofs, etc., or are otherwise obtained. My present invention includes broadly the utilization of such agents, irrespective of the manner in which they may be obtained.

The agents to be used in carrying out my invention, and which are included within the term "acridine series of hydrocarbons," in this specification and in the claims, are acridine and its derivatives, and salts of the same. Mixtures of the same may be used.

The said acridine series of hydrocarbons may be obtained from tar residues, tar-oil, acid-tar, wood-tar, or other organic distillation products, such as bone oil, by well-known processes, and need not be purified or be wholly free from other constituents of said substances, which constituents, however, act not only as diluents, but act deleteriously in the process and interfere with the beneficial action of said acridine series.

The following may be given as an example of my process:

A small amount of the flotation agent consisting substantially of acridine, or a derivative or salt thereof, either concentrated or mixed with water, or other solvent, is added to and mixed with the ore pulp to be treated, in any suitable way. The pulp is then subjected to mechanical agitation, or to direct aeration without agitation, as by passing air, or other gas, thereinto through a porous medium, as in the bubbles column process.

The amount of the reagents used will vary somewhat with different ores and has been found by me in practice to be between 0.15 pound to 0.75 pound per ton of dry ore.

With some ore pulps it may be desirable to add either small amounts of acid or of alkali, depending upon the nature of the ore pulp being treated.

A characteristic feature of the hereinmentioned reagents is the fact that they exercise an exceedingly great selective action, causing the mineral to float quickly and practically free from gangue.

While I have disclosed the use of acridine, its derivatives and salts as flotation agents in the concentration of ores, and hereinafter claim the same, it will be understood that such reagents may be used as above outlined, either alone or in combination with other reagents, which may act as diluents, or which may be used for the purpose of facilitating the action of the acridine, but that such agents should not be used to act deleteriously or interfere in a marked manner with the beneficial action of the acridine, its derivatives and salts.

What I claim and desire to secure by Letters Patent of the United States is:—

1. The process of concentrating ores, which consists in subjecting a pulp of finely divided ore and water to the action of a flotation agent, consisting substantially wholly of an acridine constituent, and introducing gas into such mixture to cause the flotation and separation of the metalliferous matter from the gangue.

2. The process of concentrating ores, which consists in subjecting a pulp of finely divided ore and water to the action of a flotation agent, consisting substantially wholly of a small proportion of an acridine constituent amounting to a fraction of one pound per ton of dry ore treated, and introducing gas into said mixture to cause the flotation and separation of the metalliferous matter from the gangue.

In testimony whereof, I have subscribed my name.

HUGO EDWARD FREDRICK.